Patented Mar. 14, 1950

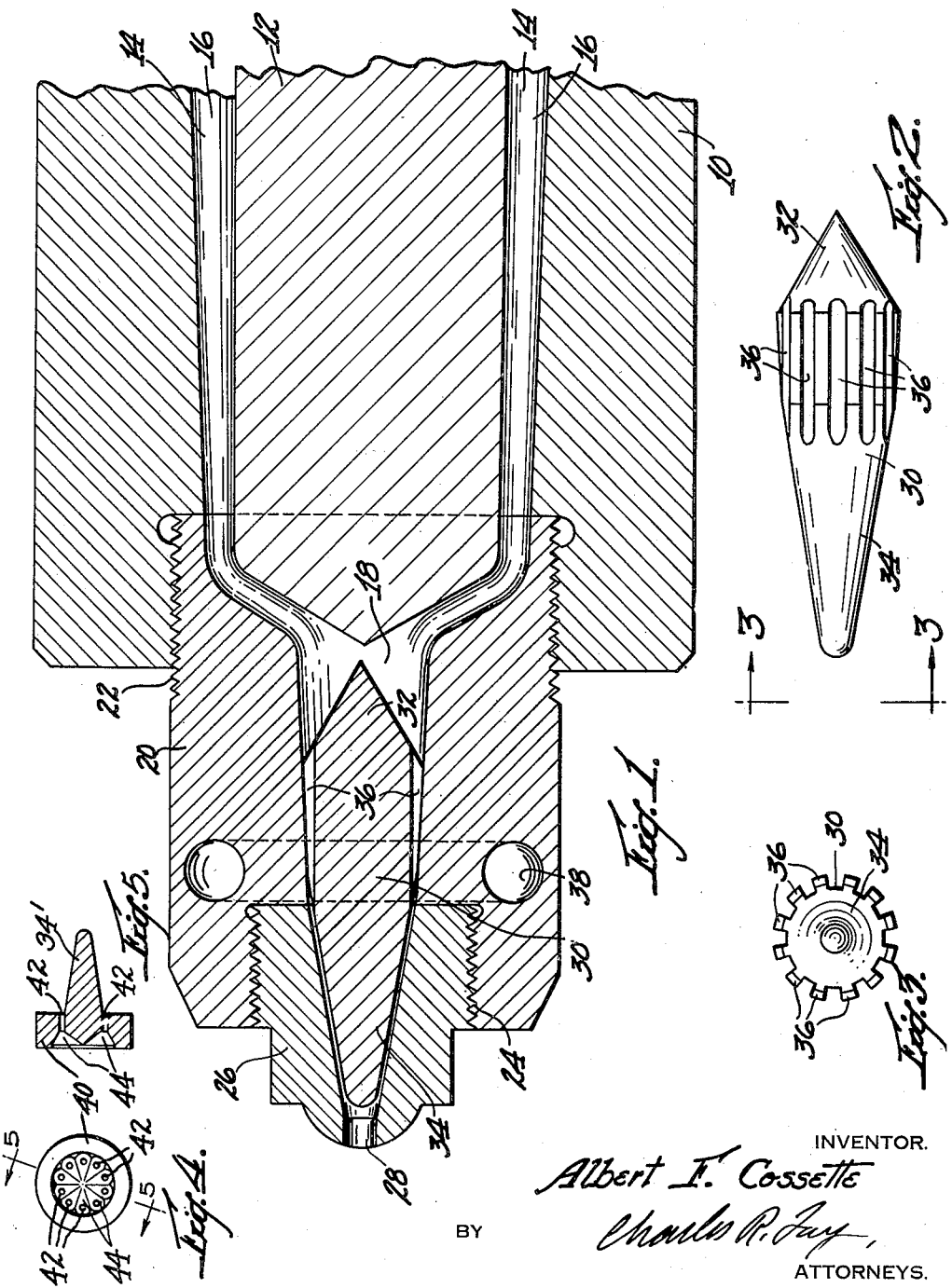

2,500,401

UNITED STATES PATENT OFFICE 2,500,401

NOZZLE HEAD FOR INJECTION MOLDING

Albert F. Cossette, Leominster, Mass., assignor to Leominster Tool Company, Inc., Leominster, Mass., a corporation of Massachusetts Application July 25, 1947, Serial No. 763,601

6 Claims. (Cl. 18—30)

Certain polymeric materials lend themselves to formation of filaments but due to their excessive liquidity at molding heats, they are very difficult to mold into shapes because of leaking and oozing at the nozzle of the molding machine. It has been proposed to utilize fine mesh screens and filters in combination with drilled blocks to overcome this difficulty by retardation, but this has not been uniformly successful, and the primary object of the present invention is to provide a molding nozzle head which will prevent leaking and oozing without the use of screens, filters, or drilled blocks.

Plastic injection molding machines are provided with heating cylinders to heat the plastic material to molding temperatures and the heating cylinder is most successfully used with a separator to evenly spread the heat. The present invention has for an object the provision of a nozzle having a heat conducting centralized separator therein and a heating unit to control and evenly heat the material in the nozzle substantially right up to the mold, said separator forming with the nozzle a plurality of fine, tapering molding material conducting grooves by means of flutes on the nozzle separator, said flutes being precision made to contact the interior wall of the nozzle, thus conducting the heat to the separator at the center of mass of flowing plastic, the separator being torpedo shaped for greater effectiveness and smoother flow, this heat control obviating the difficulties in molding above described.

Other objects and advantages of the invention will appear hereinafter.

Reference is to be had to the accompanying drawings in which

Fig. 1 is a central section through the nozzle head and adjacent heating cylinder;

Fig. 2 is a view in elevation of the nozzle separator; and

Fig. 3 is an end view thereof;

Fig. 4 is an end view of a modified separator; and

Fig. 5 is a section on line 5—5 of Fig. 4.

A heating cylinder of a plastic injection molding machine is shown at 10, this cylinder being broken away and more fully shown in copending application S. N. 684,666, filed July 19, 1946 now Patent No. 2,480,838. In the cylinder is located a separator 12 having flutes 14 forming tapering grooves for the plastic material, as more fully brought out in the application referred to. The plastic material is forced along the grooves as at 16 flowing past the nozzle end of separator 12 in streams to converge in a pocket 18 in hollow nozzle body 20. The latter is interiorly formed to correspond to the shape of the separator end and is secured to the heating cylinder 10 as, for instance, by the threads 22.

From pocket 18 the hollow interior of the nozzle body 20 tapers down to a threaded recessed end portion at 24 and in this portion, the nozzle 26 is secured. The nozzle 26 also interiorly tapers down but more sharply and has an exit end 28 to fit the mold, not shown.

A nozzle separator 30 is provided of torpedo shape, having a conical rear end 32 pointed toward the forward end of the heating cylinder separator 12, and a tapered conical forward end 34 extending almost the length of the nozzle 26. The forward end 34 is blunt, and is quite closely spaced from the interior of the nozzle 26.

As herein illustrated, the nozzle separator is provided with a plurality of tapered flutes 36 which precisely fit the corresponding interior tapered surface of the nozzle body 20. The flutes 36 are located just between the conical end portions 32 and 34 of the nozzle separator and form tapering grooves therebetween and in conjunction with the interior of the nozzle body. These grooves are much smaller than those occasioned by heating cylinder flutes 14 and, of course, much more finely divide the fluid plastic.

A space 38 is provided for a nozzle heating element which may be of usual design, and it will be seen that the flutes 36 conduct the heat to the material in the grooves and to the nozzle separator 30 so that the heat and consequently the fluidity of the plastic is controlled right into the mold.

It is to be noted that the space between the nozzle 26 and conical part 34 of the nozzle separator is less than the depth of the grooves occasioned by flutes 36, and also that these grooves should be tapered as shown although the precise construction for obtaining this is capable of variation.

This invention provides a delicate and accurate control of heat, all the way through the nozzle, of the plastic material being molded, and the new nozzle construction also provides for accurate control of the plastic material flow, thus making it impossible for the material to blow, leak, or ooze, regardless of the degree of liquidity thereof.

A modified nozzle separator is shown in Figs. 4 and 5 in which a barrel 40, circular in form, is made to fit the bore of the nozzle body 20 the same as before, this barrel having a plurality of drilled holes 42 leading from convergent hollows 44 through the barrel and into the nozzle 26. The plastic material will, of course, flow down the tapering forward end 34' just as before, this tapering end being just like the similar end 34 of Figs. 1 and 2. In this form the holes 42 take the place of the grooves between the flutes 36.

Having thus described my invention and the advantages thereof, I do not wish to be limited to the details herein disclosed otherwise than as set forth in the claims, but what I claim is:

1. A nozzle head for the injection molding of materials of relatively high liquidity comprising a cylinder, a separator therein, a hollow nozzle body, a nozzle separator member therein, flutes on the nozzle separator member contacting the interior wall of the hollow nozzle body and forming grooves between the nozzle separator and body, a nozzle, said nozzle separator extending into the nozzle for the major portion of the length of the latter, the interior wall of the nozzle and the portion of the nozzle separator extending thereinto being closely spaced circumferentially thereof.

2. The nozzle head of claim 1 including a heating element in the nozzle body surrounding the fluted portion of the separator.

3. The nozzle head of claim 1 wherein the grooves formed by the flutes taper down toward the nozzle in a radial direction.

4. In combination, a heating cylinder for an injection molding machine and a separator therein, with a nozzle head therefor comprising a hollow nozzle body, a hollow nozzle on the body, and a separator in the body, flutes on the nozzle separator contacting the interior wall of the nozzle body and forming tapered grooves, said grooves leading from a point in advance of the heating cylinder separator to the nozzle and tapering down toward the nozzle.

5. In combination, a heating cylinder for an injection molding machine and a separator therein, with a nozzle head therefor comprising a hollow nozzle body, a hollow nozzle on the body, and a separator in the body, flutes on the nozzle separator contacting the interior wall of the nozzle body and forming tapered grooves, said grooves leading from a point in advance of the heating cylinder separator to the nozzle and tapering down toward the nozzle, a tapered end on the nozzle separator at one end of the nozzle grooves and pointing toward the heating cylinder separator.

6. In combination, a heating cylinder for an injection molding machine and a separator therein, with a nozzle head therefor comprising a hollow nozzle body, a hollow nozzle on the body, and a separator in the body, flutes on the nozzle separator contacting the interior wall of the nozzle body and forming tapered grooves, said grooves leading from a point in advance of the heating cylinder separator to the nozzle and tapering down toward the nozzle, and a tapered end on the nozzle separator, said tapered end lying in the nozzle, the latter being interiorly tapered in conformance thereto.

ALBERT F. COSSETTE.

REFERENCES CITED

The following references are of record in the file of this patent:

UNITED STATES PATENTS

| Number | Name | Date |
|---|---|---|
| 2,226,447 | Smith et al. | Dec. 24, 1940 |
| 2,268,026 | Ernst et al. | Dec. 30, 1941 |
| 2,358,354 | Stacy et al. | Sept. 19, 1944 |
| 2,373,939 | Bailey | Apr. 17, 1945 |